United States Patent [19]

Erickson

[11] 4,394,671

[45] Jul. 19, 1983

[54] ELECTROGRAPHIC RECORDING

[75] Inventor: Roger D. Erickson, Denver, Colo.

[73] Assignee: Honeywell Inc., Minneapolis, Minn.

[21] Appl. No.: 202,376

[22] Filed: Oct. 30, 1980

[51] Int. Cl.³ .......... G01D 15/06

[52] U.S. Cl. .......... 346/155

[58] Field of Search .......... 346/153.1, 155; 118/657, 658; 430/48, 122

[56] References Cited

U.S. PATENT DOCUMENTS 4,316,198 2/1982 Erickson .......... 346/153.1 X

*Primary Examiner*—L. T. Hix

*Assistant Examiner*—Thomas H. Tarcza

*Attorney, Agent, or Firm*—Charles J. Ungemach

[57] ABSTRACT

In an electrographic recording system wherein a dynamic bridge of toner particles, the particles having electrical and magnetic properties, corresponding to a concentrated magnetic field formed between a toner carrier and the recording medium, an improved stylus array is provided. The stylus array includes a thin strip of magnetically permeable material secured to the undersurface of the stylus array but insulated from the styli, themselves. The permeable strip tends to modify the configuration of the magnetic field, pulling the toner bridge into intimate contact with the tips of the styli.

7 Claims, 3 Drawing Figures

ELECTROGRAPHIC RECORDING

CROSS REFERENCE

Cross reference is made to a copending application of Roger D. Erickson Ser. No. 152,599 filed May 23, 1980, titled "Electrographic Recording", now U.S. Pat. No. 4,316,198.

BACKGROUND OF THE INVENTION

The present invention relates to electrographic recording. More particularly, it relates to an improved means and method for controlling the toner supply for such recording.

In the above-identified copending applicaton of Roger D. Erickson, there has been disclosed an electrographic recording system which includes means wherein toner powder having electrical and magnetic properties is carried from a hopper to a recording station by a rotatable drum or shell. The shell is rotated about a magnetic core structure which produces a magnetic field to hold the toner powder onto the surface of the shell as it rotates. At the recording station, a dynamic bridge of the toner powder is formed between the periphery of the drum or shell and a magnetically permeable member positioned a predetermined distance from the surface of the drum or shell. A record member is driven along a path between the drum and the permeable member with the reverse side of the record member in contact with the permeable member. An array of recording electrodes is positioned to be in electrical contact with the toner powder in the bridge. The record member is backed up by a platen member at least a portion of which is electrically conductive. When one or more of the electrodes is energized, a conductive path is established from the electrode, through the bridge, to the surface of the recording member and the conductive back-up platen, electrically charging the dielectric surface of a recording member to deposit toner powder thereon.

In the aforementioned copending application, the electrodes are positioned to be in electrical contact with the toner particles in the dynamic bridge. It has been found that the positioning of the magnetically permeable member relative to the magnetic core and the postioning of the electrodes or styli relative to the toner bridge is quite critical in order to produce optimum recording characteristics.

SUMMARY OF THE INVENTION

It is, accordingly, an object of the present invention to provide an improved electrographic recording apparatus which avoids the shortcomings of the aforementioned system.

It is another object of the present invention to provide an improved electrographic recording apparatus as set forth which features improved toner bridge definition means.

In accomplishing these and other objects, there has been provided in accordance with the present invention an electrographic recording apparatus of the type wherein a dynamic toner bridge is formed between a rotating shell and a permeable magnetic strip positioned a predetermined small distance from the periphery of the shell to define a recording station. Electrodes are positioned at the recording station to impart a recording signal to the toner in the toner bridge to effect a recording of data on a record member passing the recording station. A strip of magnetic material is secured to the undersurface of the electrode array to provide a modification of the magnetic field defining the toner bridge, thereby effecting an intimate contact with the electrodes and more sharply defining the toner bridge at the recording station.

BRIEF DESCRIPTION OF THE DRAWINGS

A better understanding of the present invention may be had from the following detailed description when read in the light of the accompanying drawings in which.

DETAILED DESCRIPTION

Figure 1:
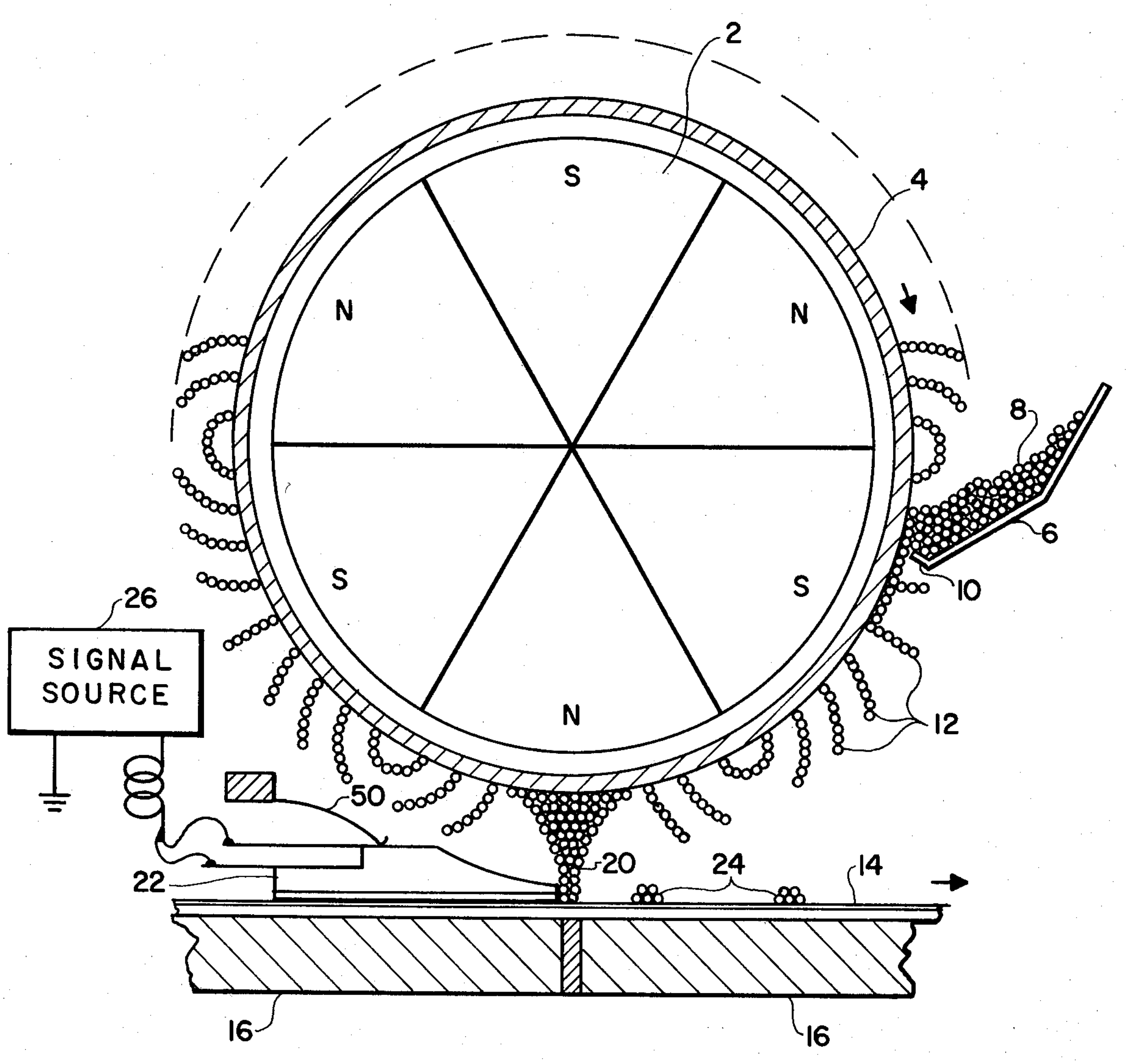
FIG. 1 is a cross sectional view of an electrographic recording apparatus.

Referring now to the drawings in more detail there is shown in FIG. 1 a recording system wherein a magnetic core structure 2 defines a plurality of alternate magnetic poles about the cylindrical periphery thereof. Surrounding the magnetic core structure is a cylindrical drum or shell 4 formed of non-conductive non-magnetic material. The drum is arranged to be rotationally driven about the magnetic core structure by conventional means (not herein shown). A hopper 6 is positioned adjacent the periphery of the drum 4 and is coextensive therewith. The hopper contains a quantity of toner powder 8. The toner powder is both electronically conductive and magnetically responsive in the manner shown in U.S. Pat. Nos. 3,816,840—Kotz; 3,879,337—Lunde and 3,946,402—Lunde. The magnetic fields produced by the magnetic core structure 2 causes the magnetic toner particles 8 to be attracted to the surface of the drum 4. The lower edge 10 of the hopper structure 6, the edge adjacent the periphery of the drum 4, constitutes a doctor blade for metering a predetermined quantity of the toner onto the surface of the drum 4. As the toner is moved by the rotating drum past the doctor blade 10, the toner forms whisker-like strings 12 conforming to the pattern of the magnetic fields established by the magnetic core structure 2.

Positioned adjacent to but spaced from the outer periphery of the drum 4 is means for defining a path along which a record member 14 is drawn. The record member 14 is preferably in the form of a substrate carrier which is at least slightly electrically conductive and on the surface of which is a dielectric coating. The means for defining the path for the record member 14 is a non-magnetic back plate or platen 16. Embedded in the back plate 16 or sandwiched between two segments of the back plate 16 there is positioned a thin magnetically permeable strip 18 the strip is positioned to be parallel to the axis of the drum 4 and with the narrow edge positioned at the point of nearest approach to the surface of the drum 4. This position is defined as the recording station. At least a portion of the back plate opposite the toner bridge must be electrically conductive and make electrical contact with the recording medium; this may be the magnetically permeable strip. Alternatively, the back plate 16 may itself be electrically conductive. In either event, the electrically conductive portion of the back plate 16 or the electrically conductive magnetically permeable strip 18 is connected to ground.

The presence of the magnetically permeable strip 18 causes a relatively sharpely defined concentration of the magnetic field produced by the magnetic core structure in the space between the drum 4 and the member 18. Since the whisker-like strings of the toner particles 12 substantially conform to the pattern of the magnetic field, a concentrated relatively sharply defined toner bridge 20 extends between the periphery of the drum 4 and the upper surface of the recording member 14. So long as the drum 4 continues to rotate, magnetic toner particles are constantly being added to and removed from the bridge 20 while the bridge 20 itself remains stably in position. This is herein referred to as a dynamic bridge. The toner particles removed from the bridge form the string-like whiskers 12 on the opposite side of the bridge and continue around the drum until they rejoin the toner 8 in the hopper 6. As the record member 14 is drawn past the end of the bridge 20, the toner particles in the bridge brush across the surface of the record member but substantially none of the toner particles are deposited on the surface of the record member since the magnetic field maintains control in the attraction of the toner particles.

In order to effect a recording of data on the record member, an array of conductive electrodes or styli 22 is positioned in the space between the drum 4 and the surface of the record member 14. The electrodes or styli are positioned to intercept and have at least the extremities thereof in physical and electrical contact with the toner in the bridge 20. When an electrical pulse is applied to one or more of the electrodes or styli 22, an electrical charge passes from the electrodes down through the toner bridge to the dielectric surface of the record member 14. That pulse results in an electrostatic charge being placed on the dielectric surface of the record member 14. The electrostatic charge overcomes the magnetic attraction of the particles and causes a deposit 24 of the toner particles on the surface of the record member 14.

In the illustrated embodiment, a signal source means 26 is shown with one set of leads connected, respectively, to the several electrodes or styli 22 and with the other lead grounded. The electrically conductive portion of the back plate 16, or the magnetically permeable strip 18 is also grounded. Thus a signal applied to the electrode 22 from a signal source 26 and through the bridge 20 effectively charges the dielectric surface of the record member 14. The opposite charge being applied through the grounded backing means and the conductive backing of the record member 14. The charges thus imposed upon the surface of the record member 14 provides an attractive force for the particles of toner from bridge 20 to overpower the magnetic attraction and thereby cause a deposit of the toner particles 24 to be imposed upon the record member 14 in the pattern of the elemental charges.

Figure 2:
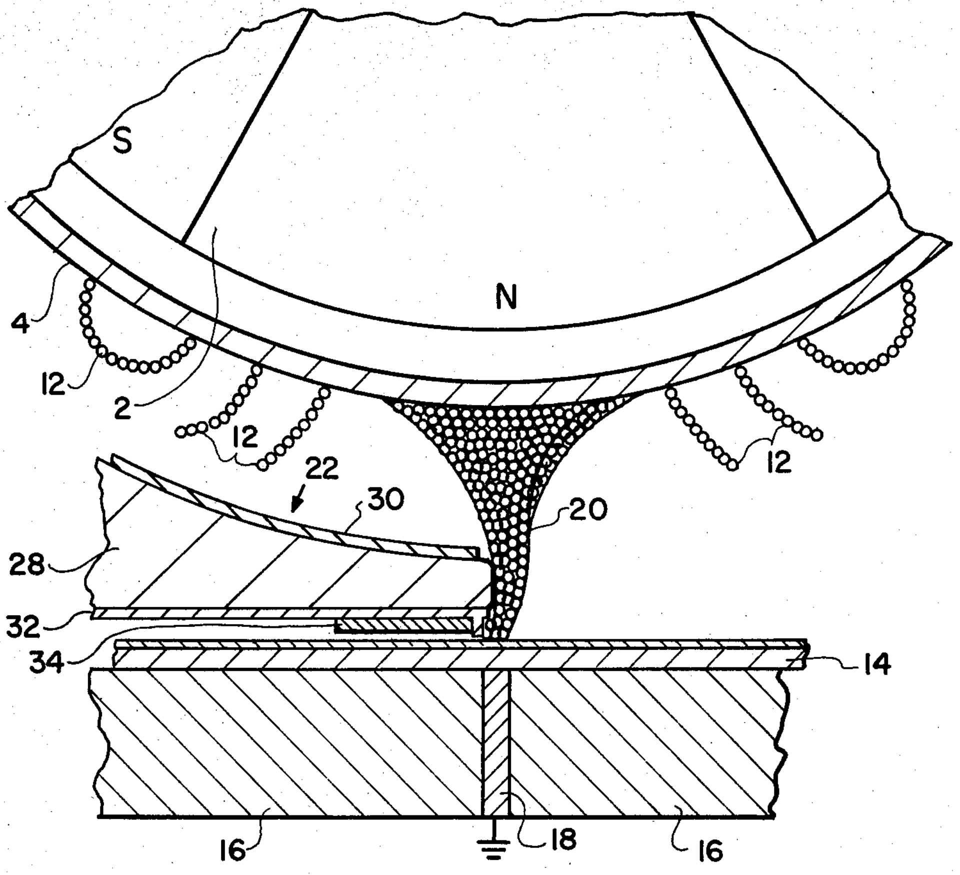
FIG. 2 is a enlarged fragmentary view of apparatus of the type shown in FIG. 1 and embodying the present invention in one form.

As was previously mentioned, the positioning of the permeable strip 18 relative to the magnetic core structure and the positioning of the stylus array 22 relative to the dynamic bridge 20 is quite critical in order to form optimum traces on the record member 14. In FIG. 2 there is shown means for reducing the criticality of the positioning of the elements and which further serves to sharpen the definition of the toner bridge 20 at the recording station. One of the conditions that renders the positioning of the elements critical is the need to assure an intimate physical and electrical contact between the tips of the styli 22 and the particles of the toner bridge 20. In FIG. 2 there is shown a structure which enhances the intimacy of the contact between the tips of the stylus assembly 22 and the toner particles in the bridge 20. The core assembly 2 and the non-magnetic rotatable shell 4 are identical to those shown in the aforementioned copending application of Roger D. Erickson. Under the influence of the magnetic fields established by the core structure 2, whisker-like strings of toner particles 12 are formed on the outer periphery of the drum 4. At the recording station, means are provided for concentrating the magnetic field and the whisker-like strings of toner particles conforming thereto to form the toner bridge 20. A back-up platen 16 of non-magnetic material defines a path of movement for the record member 14. A magnetically permeable strip member 18 is positioned in the back-up platen 16 at a position approximating the nearest approach of the drum 4 to the surface of the back-up platen 16. This magnetically permeable strip provides a magnetically responsive element for concentrating a magnetic field between the surface of the drum 4 and the surface of the back-up platen 16, which field is produced by the magnetic core structure 2. The whisker-like strings of toner particles 12 are then concentrated to form a toner bridge 20, as in the case of the aforementioned copending application of Roger D. Erickson.

The stylus structure as illustrated in FIG. 2, includes a plurality of stylus elements 28 formed of a conductive material, one of which is shown in FIG. 2. Overlying the assembled stylus elements is an insulating layer 30. The insulating layer covers substantially the entire upper surface of the stylus assembly but leaves the operating tips of the styli exposed to engage the toner particles in the toner bridge 20. The lower surface of the stylus assembly is also provided with an insulating layer 32 which covers the entire lower surface of the stylus assembly, again leaving the tips of the styli exposed for engagement with the toner particles of the toner bridge 20. A second magnetically permeable member 34, which may be in the form of a thin strip of magnetically permeable foil, is secured to the lower surface of the stylus assembly, separated from the styli themselves by the insulating layer 32. A small segment of the insulating layer 32 is also provided to cover the forward edge of the magnetically permeable strip 34. The magnetically permeable strip 34 is positioned slightly back from the tip end of the stylus elements 28.

By induction from the magnetic core structure 2, an auxiliary magnetic field is set up in the permeable strip 34. This magnetic field which embraces the toner bridge 20 causes the lower end of that toner bridge to be drawn to and somewhat wrapped about the tips of the stylus elements 28 assuring an intimate contact therewith. Further, the presence of the auxiliary magnetic field set up in permeable strip 34 tends to sharpen the magnetic field and enhance the definition of the toner bridge 20 at the point of contact with the upper surface of the record medium 14. When electrical signals to be recorded are applied to selected ones of the stylus elements 28, the intimate contact with the tips of the stylus elements with the toner particles in the toner bridge 20 causes a corresponding deposit of the toner particles on the surface of the record member 14. Additionally, the sharper definition of the end of the toner bridge in contact with the surface of the record member assures a better lateral definition of the toner deposits on the surface of the record member 14 resulting from the application of the electrical signals to the stylus elements 28.

Figure 3:
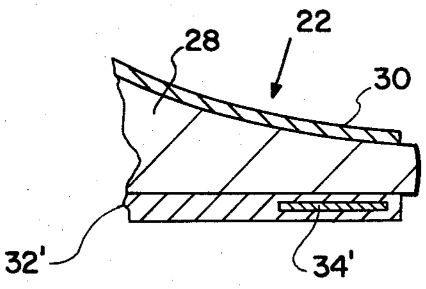
FIG. 3 is a fragmentary view of a recording apparatus of the type shown in FIG. 1 and embodying the present invention in a somewhat different form.

In FIG. 3 there is shown a structure which is analogous to that shown in FIG. 2 but with a slightly modified arrangement. In the form shown in FIG. 3, the magnetically permeable strip 34' is embedded within the insulating layer 32' on the lower surface of the stylus assembly 22. Although the structure shown in FIG. 3 is electrically and magnetically identical to that shown in FIG. 2, the mechanical properties of the structure shown in FIG. 2 allows a smooth uniform lower surface of insulating material 32 which may serve to effect a proper spacing in the lower surface of the stylus assembly 22 and the upper surface of a record member 14. At the same time it provides a low friction non-conductive surface for engagement with the upper surface of the record member 14.

Thus there has been provided in accordance with the present invention, an improved electrographic recording apparatus wherein means are provided for enhancing the intimacy of the engagement between the tips of the stylus assembly and the toner bridge and which serve to improve the definition of the toner bridge at the recording station.

The embodiments of the invention in which an exclusive property or privilege is claimd are defined as follows:

1. An electrographic recording system for recording information on an electrographic recording medium, comprising:

- a non-magnetic platen over which said recording medium passes;
- a multipolar magnetic structure;
- a non-magnetic shell;
- means mounting said shell for motion about said magnetic structure with the peripheral surface of said shell spaced a small predetermined distance above said platen;
- means for supplying magnetic toner particles to the outer surface of said shell;
- means for defining a recording station substantially at the position of nearest approach of said shell to the upper surface of said platen;
- an array of recording styli positioned at said recording station and spaced between the peripheral surface of said shell and said platen;
- said means for defining a recording station including a magnetically permeable strip secured to but insulated from the under surface of said array of recording styli, said magnetically permeable strip concentrating the magnetic field produced by said magnetic structure to form a dynamic bridge of toner particles between said shell and said recording medium at said recording station.

2. An electrographic recording system as set forth in claim 1 wherein the tips of said recording styli are positioned to be in physical and electrical contact with the particles in said toner bridge whereby electrical excitation of selected ones of said styli effect a corresponding deposit of toner particles on said recording medium, said magnetically permeable strip being so positioned relative to said tips as to draw said toner bridge into intimate contact with said tips.

3. An electrographic recording system as set forth in claim 2 wherein said permeable strip is positioned slightly back from the forward edge of said tips.

4. An electrographic recording system as set forth in claim 3 wherein said array of styli is provided with an insulating layer along the bottom surface thereof and said permeable strip is secured to the outer surface of said insulating layer.

5. An electrographic recording system as set forth in claim 3 wherein said array of styli is provided with an insulating layer along the bottom surface thereof and said permeable strip is embedded in said layer.

6. An electrographic recording system as set forth in claim 3 wherein a second magnetically permeable strip is positioned substantially in the plane of said platen to provide a primary concentration of said magnetic field to define said toner bridge at said recording station.

7. In an electrographic recording system for recording information on a recording medium wherein a dynamic bridge of toner particles having electrical and magnetic properties is formed corresponding to a concentrated magnetic field formed between a toner carrier and the recording medium, the improvement comprising a stylus array structure having stylus tips in physical and electrical contact with said toner particles in said bridge, and a magnetically permeable strip member secured to but insulated from the lower surface of the styli in said array whereby to draw said toner particles in said bridge into intimate contact with said stylus tips.

* * * * *